US010609645B2

(12) United States Patent
Delibie et al.

(10) Patent No.: US 10,609,645 B2
(45) Date of Patent: Mar. 31, 2020

(54) TECHNIQUE FOR READING ENERGY-SAVING METERS AT THE SMART METER LEVEL

(71) Applicant: KERLINK, Thorigne-Fouillard (FR)

(72) Inventors: Yannick Delibie, Thorigne-Fouillard (FR); Yannick Gaudin, Thorigne-Fouillard (FR)

(73) Assignee: KERLINK, Thorigne-Fouillard (FR)

( * ) Notice: Subject to any disclaimer, the term of this patent is extended or adjusted under 35 U.S.C. 154(b) by 0 days.

(21) Appl. No.: 16/093,290

(22) PCT Filed: Apr. 18, 2017

(86) PCT No.: PCT/FR2017/050913
§ 371 (c)(1),
(2) Date: Oct. 12, 2018

(87) PCT Pub. No.: WO2017/182749
PCT Pub. Date: Oct. 26, 2017

(65) Prior Publication Data
US 2019/0215770 A1 Jul. 11, 2019

(30) Foreign Application Priority Data
Apr. 20, 2016 (FR) .................................... 16 53504

(51) Int. Cl.
H04W 52/02 (2009.01)
H04L 29/08 (2006.01)
(Continued)

(52) U.S. Cl.
CPC ........ *H04W 52/0229* (2013.01); *G01D 4/004* (2013.01); *G01D 4/006* (2013.01);
(Continued)

(58) Field of Classification Search
CPC ............... H04W 4/70; H04W 52/0216; H04W 52/0229; H04W 84/18
(Continued)

(56) References Cited

U.S. PATENT DOCUMENTS

2009/0225811 A1 9/2009 Albert et al.
2016/0248577 A1* 8/2016 Ilyas ........................ H04L 7/02

FOREIGN PATENT DOCUMENTS

FR    2 879 884    6/2006

OTHER PUBLICATIONS

Obenchain,"A Discussion of Smart Meters and RF Exposure Issues," An EEI-AEIC-UTC White Paper—A Joint Project of the EEI and AEIC Meter Committees, XP055302784, Mar. 31, 2011.

* cited by examiner

*Primary Examiner* — Natasha W Cosme
(74) *Attorney, Agent, or Firm* — Greenblum & Bernstein, P.L.C.

(57) ABSTRACT

A method for establishing a communication between a gateway and a communication module, comprising: periodically radiobroadcasting from a gateway a synchronization signal, the duty cycle DC=Dx/Tx between the duration of the emission window Dx of the synchronization signal and the duration of the radiobroadcasting period Tx being less than 50%; periodically activating a receiver of a communication module activated during an awake window, the duration of the awake window being less than the duration Tr of the activation period, the duration Tr of the activation period being equal to Tr=Tx/(1+DC); receiving the synchronization radio signal by the receiver of the communication module during an overlap between a said awake window and a said emission window; radiobroadcasting a data message from an (Continued)

emitter of the communication module; and receiving the data message by a receiver of the gateway.

14 Claims, 3 Drawing Sheets

(51) Int. Cl.
*G01D 4/00* (2006.01)
*H04W 4/70* (2018.01)
*H04Q 9/00* (2006.01)
*H04W 84/18* (2009.01)

(52) U.S. Cl.
CPC ............ *H04L 67/12* (2013.01); *H04L 67/325* (2013.01); *H04Q 9/00* (2013.01); *H04W 4/70* (2018.02); *H04W 52/0216* (2013.01); *H04Q 2209/50* (2013.01); *H04Q 2209/60* (2013.01); *H04W 84/18* (2013.01); *Y02B 90/242* (2013.01); *Y02B 90/243* (2013.01); *Y02B 90/244* (2013.01); *Y02B 90/246* (2013.01); *Y04S 20/322* (2013.01); *Y04S 20/325* (2013.01); *Y04S 20/327* (2013.01); *Y04S 20/42* (2013.01); *Y04S 40/18* (2018.05)

(58) Field of Classification Search
USPC ......................................................... 370/311
See application file for complete search history.

TECHNIQUE FOR READING ENERGY-SAVING METERS AT THE SMART METER LEVEL

CROSS-REFERENCE TO RELATED APPLICATION

This application is a U.S. National Stage of PCT/FR2017/050913 filed Apr. 18, 2017, which claims priority under 35 U.S.C §§ 119(a) 365 of French Application No. 1653504 filed Apr. 20, 2016, the disclosures of which are expressly incorporated by reference herein in their entireties.

TECHNICAL FIELD

The invention pertains to the field of very low energy consumption methods and devices for communicating data by radio, in particular in the field of the Internet of things.

TECHNOLOGICAL BACKGROUND

The Internet of things consists in allowing everyday things to communicate data automatically with a wireless network. For example, a water meter equipped with a communication module can automatically communicate a water reading to the firm managing the billing of water consumption.

Some gateways, also called base stations, have the role of ensuring radio reception and emission of data from and to the communication modules present in their coverage zone as well as of relaying these data to equipment in charge of processing them, for example servers accessible over a network based on the IP ("Internet Protocol") protocol.

Several radio access technologies are available for implementing networks of communication modules. The LoRa™, Sigfox™ or else WM-Bus ("Wireless Meter Bus") technologies, which rely in particular on different types of modulation, may be cited purely by way of nonlimiting illustration.

These technologies have in common that they offer long range communications which make it possible to decrease the number of gateways by increasing the latter's coverage.

However, the continuous emission and reception of data, in particular by long range technologies mentioned above, consumes a great deal of energy, thereby limiting the lifetime of the batteries of the communication modules and requiring that the gateways be powered from the mains.

SUMMARY

The invention makes it possible to solve the problems of the prior art.

Certain aspects of the invention stem from the idea of operating a gateway from batteries, for example to render a gateway mobile.

Certain aspects of the invention stem from the idea of economizing on energy consumed by a gateway so as to increase the lifetime of the batteries powering the gateway.

Certain aspects of the invention stem from the idea of being able to remotely read data at low cost.

In one embodiment, the invention provides a method for establishing a communication between a gateway and a communication module, comprising:

periodically radiobroadcasting in successive radiobroadcasting periods from a gateway a synchronization signal, the synchronization signal being emitted during an emission window exhibiting a defined duration Dx within each radiobroadcasting period, the duty cycle DC=Dx/Tx between the duration of the emission window Dx of the synchronization signal and the duration of the radiobroadcasting period Tx being less than 50%, periodically activating in successive activation periods a receiver of a communication module, the receiver being activated during an awake window within each activation period, the duration of the awake window being less than the duration Tr of the activation period, the duration Tr of the activation period being equal to Tr=Tx/(1+DC), receiving the synchronization radio signal by the receiver of the communication module during an overlap between a said awake window and a said emission window, radiobroadcasting a data message from an emitter of the communication module, the radiobroadcasting of the data message being triggered by the reception of the synchronization signal, receiving the data message by a receiver of the gateway.

The synchronization signal is a signal for triggering the radiobroadcasting of the data message.

By virtue of these characteristics, the gateway and the communication module can be powered by batteries whose lifetime is increased, for example whose lifetime is 15 years.

By virtue of these characteristics, the internal clocks of the gateway and of the communication module do not need to be synchronized with respect to a common reference date. For example, the clocks can be inaccurate. It is therefore possible to use low-cost materials. Indeed, the maximum convergence duration is equal to:

$$Tc=Tx*(DC*(1+DC))^{-1}$$

thereby signifying that an overlap between an awake window and an overlap window when the communication module is in the range of the gateway has necessarily occurred after a duration of less than or equal to $$Tc=Tx*(DC*(1+DC))^{-1}$$

from the first emission of the synchronization signal by the gateway.

In one embodiment, the invention provides a gateway intended to communicate wirelessly with a communication module comprising a receiver exhibiting successive awake windows periodically repeated with a period of duration Tr, for example for transmitting data from this communication module to a network, the gateway comprising:

a clock configured to periodically trigger a radiobroadcasting of a synchronization signal in successive radiobroadcasting periods of duration Tx of radiobroadcasting period, an emitter configured to radiobroadcast the synchronization signal, the synchronization signal being emitted during an emission window exhibiting a defined duration Dx within each radiobroadcasting period, the duty cycle DC=Dx/Tx between the duration of the emission window Dx of the synchronization signal and the duration of the radiobroadcasting period Tx being less than 50%, the duration Tx of the radiobroadcasting period being Tx=Tr*(1+DC), and a receiver configured to receive a data message from an emitter of the communication module subsequent to an overlap between an awake window of the receiver of the communication module and a said emission window, and, if relevant, a communication interface with a network, configured to transmit the data message to the network.

In one embodiment, the invention provides a communication module able to transmit data to a gateway, comprising:

a receiver, a clock configured to periodically trigger the activation of the receiver in activation periods during an awake window, the duration of the awake window being less than 1% of the duration Tr of the activation period, the receiver being able to receive a synchronization radio signal emitted by a gateway during an overlap of an awake window with a window of emission of a synchronization signal emitted by a gateway, a memory comprising data to be transmitted, an emitter configured to radiobroadcast a data message in response to the reception of the synchronization radio signal by the receiver.

According to embodiments, the method described hereinabove, the gateway described hereinabove and the module described hereinabove can comprise one or more of the characteristics hereinbelow.

In one embodiment, the radiobroadcasting of the data message is triggered after a latency lag following the reception by the receiver of the communication module of the synchronization signal.

By virtue of these characteristics, collisions between data messages radiobroadcast by different communication modules are avoided.

In one embodiment, the latency lag is less than the duration of the activation period Tr.

In one embodiment, the latency lag is pseudo random within a collection of different communication modules. For example, the latency lag is generated by taking account of the serial number of the communication module.

In one embodiment, the duty cycle DC is less than a regulatory threshold.

In one embodiment, the duty cycle is DC=10%.

In one embodiment, the range of the gateway is greater than 1 km.

For example, technologies such as the Long Range (LoRa) or SIGFOX technologies can be used for the radio emission of the gateway. Preferentially, the power used by the receiver of the communication module is less than 25 mW and the power used by an emitter of the gateway is less than 500 mW.

In one embodiment, the gateway is geographically mobile.

By virtue of these characteristics, the gateway can harvest data over a chosen geographical area.

In one embodiment, the duration Tx of the radiobroadcasting period is between 2 seconds and 30 seconds, preferentially the duration Tx of the radiobroadcasting period is 6.6 seconds.

In one embodiment, the duty cycle DC is 10% and the duration Tx of the radiobroadcasting period is 6.6 seconds. In this embodiment, the duration of the emission window is therefore 0.6 seconds and the duration of the activation period is 6 seconds.

In one embodiment, the convergence period is between 30 seconds and 2 minutes, preferentially the convergence period is about 60 seconds.

Indeed, a mobile gateway of range equal to 1 km moving at the speed of 30 km/h will require a duration equal to a maximum convergence period of 2 minutes plus the latency lag in order to remotely read a water, electricity, gas meter or any measurement apparatus equipped with a communication module of range equal to 1 km.

A mobile gateway of range equal to 1 km moving at the speed of 120 km/h will require a duration equal to a maximum convergence period of 30 seconds plus the latency lag in order to remotely read a water, electricity, gas meter or any measurement apparatus equipped with a communication module of range equal to 1 km.

A mobile gateway of range equal to 1 km moving at the speed of 30 km/h will require a duration equal to a maximum convergence period of 171 seconds plus the latency lag in order to remotely read a water, electricity, gas meter or any measurement apparatus equipped with a communication module of range equal to 700 m. For the same respective ranges of mobile gateway (1 km) and of communication module (700 m), a speed of the mobile gateway of 50 km/h will require a duration equal to a maximum convergence period of 103 seconds plus the latency lag and a speed of the mobile gateway of 120 km/h will require a duration equal to a maximum convergence period of 43 seconds plus the latency lag.

Indeed, the communication module remains within the range of the gateway during the maximum convergence period, which is the maximum duration required in order to allow the communication module to receive the synchronization signal.

Indeed, the gateway remains within the range of the communication module for a minimum duration equal to the latency lag after the module has received the synchronization signal, thereby allowing the gateway to receive the data message.

In one embodiment, the duration of the awake window is between 5 msec and 15 msec, preferentially the duration of the awake window is about 10 msec.

In one embodiment, the receiver of the communication module prolongs the duration of an awake window during an overlap between the awake window and a said emission window, until the end of the emission window.

In one embodiment, the synchronization signal comprises a preamble, a synchronization word and the identity of the gateway.

In one embodiment, the communication module furthermore comprises an interface with an apparatus, the interface being able to acquire data to be recorded in the memory. For example, the data are recorded periodically. For example, the recording period is more than 1000 times greater than the activation period. For example, these data are water or electricity meter readings.

The invention also provides an automotive vehicle comprising a gateway described hereinabove, in which the emitter of the gateway exhibits a radiobroadcasting range of at least 1 km.

The invention also provides a radio communication system comprising an aforementioned gateway and a plurality of aforementioned communication modules disposed in a zone of radio coverage of the emitter of the gateway.

Preferably, the emitter of each communication module is configured to radiobroadcast the data message after a latency lag following the reception by the receiver of the communication module of the synchronization signal, the latency lag being configured in the memory of the communication module.

BRIEF DESCRIPTION OF THE FIGURES

The invention will be better understood, and other aims, details, characteristics and advantages thereof will be more clearly apparent in the course of the following description of several particular embodiments of the invention, which are given solely by way of nonlimiting illustration, with reference to the appended drawings.

DETAILED DESCRIPTION OF EMBODIMENTS

Figure 3:
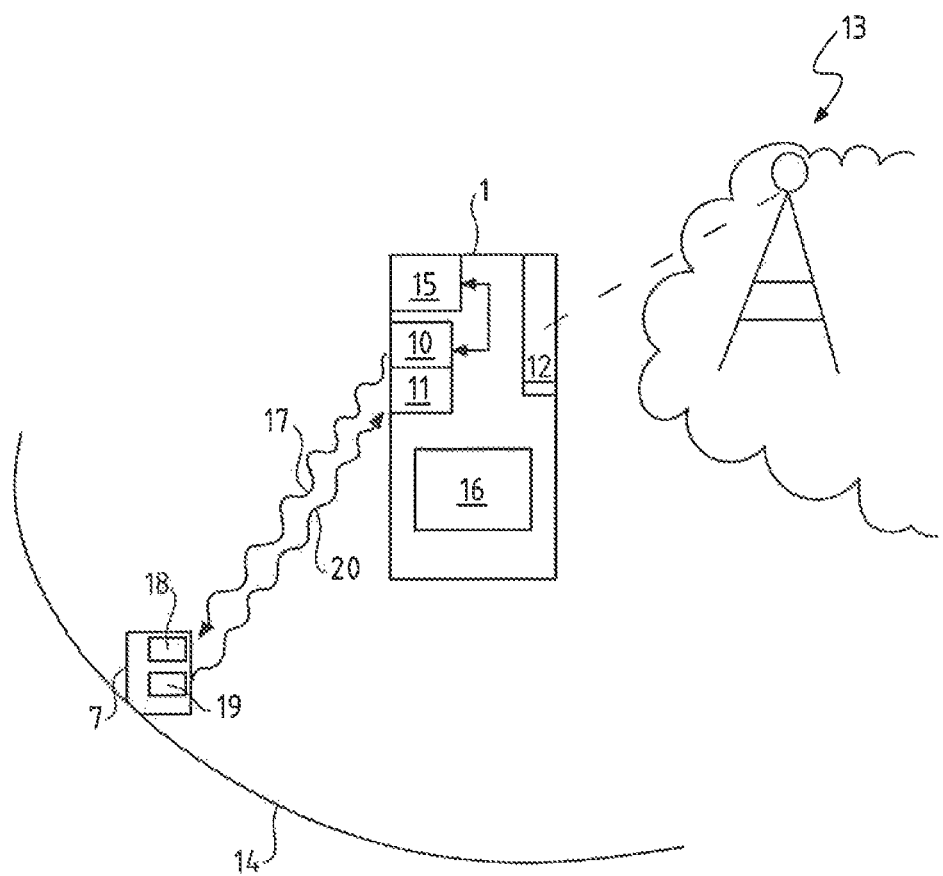
FIG. 3 is a diagram of a gateway and of a communication module exchanging data.

FIG. 3 represents a gateway 1 according to one embodiment of the invention. The gateway 1 is an interface allowing radio communication of data from a communication module 7 to a network 13, for example a local IP network or a wide area network such as the Internet network.

The gateway 1 comprises an interface 12 able to communicate with the network 13. Thus, radio data exchanged with a communication module 7 can be transmitted to the network 13.

The gateway 1 comprises an emitter 10 and a receiver 11 able to emit and receive radio waves to and from communication modules 7.

The emitter 10 and the receiver 11 comprise at least one antenna intended to radiate or to pick up the radio waves conveying the data to be exchanged with the communication modules 7 in a range 14 of radius of one kilometer via a radio transmission channel.

The emitter 10 and the receiver 11 also comprise, in a manner known per se, means of analog and digital processing of the radio waves in the radio transmission channel.

The gateway 1 comprises a clock 15 able to periodically trigger the dispatching of a synchronization signal 17 during successive radiobroadcasting periods. The duration of a radiobroadcasting period is configured to be Tx=6.6 seconds.

The receiver 11 is continuously active. The emitter 10 is configured to be active only during emission windows.

For regulatory reasons of radio transmission channel occupancy, the maximum permitted duty cycle, DC, is 10%. The duty cycle is defined as the ratio between a duration of emitted signal and a duration of radiobroadcasting period.

Thus, the emitter 10 is configured to periodically emit synchronization signals 17 of emission window duration Dx=0.6 seconds so as to comply with DC=Dx/Tx.

The synchronization signal comprises a synchronization word, also called a "SyncWord", and a short data message comprising the identity of the gateway 1.

The duration of an emission window is adjustable by preceding the synchronization word by a preamble of adjustable length.

The gateway also comprises means for processing the signal and for checking which are neither represented nor described.

Finally, the gateway 1 comprises a battery 16 allowing it to be powered.

A communication module 7 is also described in FIG. 3. The communication module 7 comprises a receiver 18.

The communication module 7 also comprises a clock (not represented) configured to periodically trigger the activation of the receiver 18 in activation periods of duration Tr=6 s during an awake window of 10 ms.

The receiver 18 is configured to receive the synchronization signal 17 during an overlap of an awake window with a window of emission of the synchronization signal 17 emitted by a gateway 1.

The communication module also comprises an emitter 19 able to radiobroadcast a data message 20 in response to the reception of the synchronization signal 17.

The emitter 19 is configured so that the radiobroadcasting of the data message 20 is triggered after a latency lag A following the actual reception by the receiver 18 of the communication module 7 of the synchronization signal 17.

Figure 4:
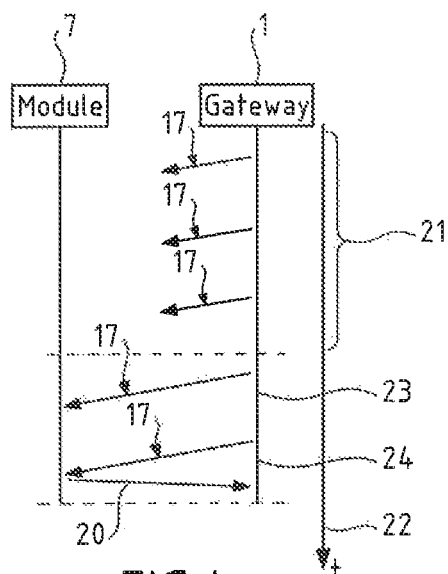
FIG. 4 is a diagram of emission of synchronization by the gateway of FIG. 3 and of response of a communication module of FIG. 3.

FIG. 4 represents the periodic transmission of the synchronization signal 17 by the gateway 1.

In the case where the gateway 1 is mobile, the communication module 7 may be situated outside of the range 14 of the gateway 1. This is what is represented on the time axis 22 by the duration 21: the synchronization signal 17 does not reach the target of the communication module 7 and no communication of data is performed between the gateway 1 and the communication module 7.

As the mobile gateway 1 approaches the communication module 7, the communication module 7 comes within the range 14.

The receiver 18 of the communication module 7 can therefore receive the synchronization signal 17 of the gateway 1. However, the receiver 18 of the communication module 7 is not active continuously but only during awake windows.

The synchronization signal 17 having arrived at the moment 23 is therefore not read by the receiver 18 which is inactive.

During the moment 24, the receiver 18 is awake. There is therefore overlap of the awake window and of the emission window.

Thus, the receiver 18 of the communication module 7 actually receives the synchronization signal 17 of the gateway 1.

The communication module 7 is configured so that, during the reception of a synchronization signal 17, the awake window is prolonged.

Thus, the communication module 7 can read the synchronization word contained in the synchronization signal 17, as well as the identity of the gateway 1, and respond by transmitting the data message 20.

Figure 5:
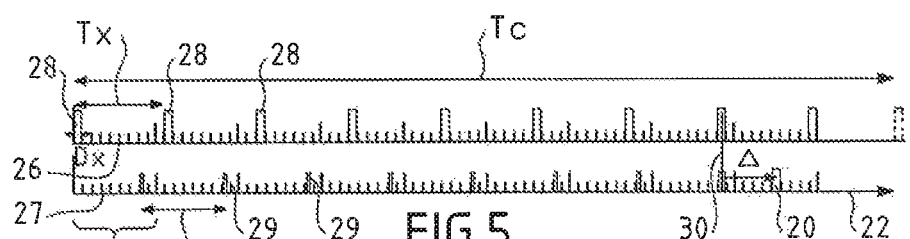
FIG. 5 is a diagram showing the periodic emission of a synchronization signal by the gateway and the periodic opening of window of listening by a first communication module, and by a second communication module.
Figure 6:
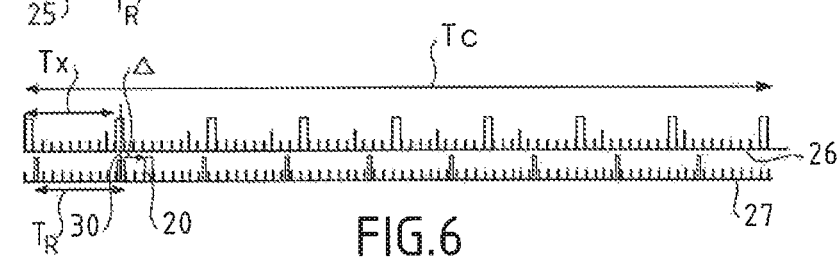
FIG. 6 is the diagram of FIG. 5 for a second communication module.

FIG. 5 illustrates more precisely the overlap of an awake window with an emission window for a first communication module 7, while FIG. 6 illustrates the overlap of an awake window with an emission window for a second communication module 7.

In FIGS. 5 and 6, the time axis 22 is cut up into elementary periods 25 of fixed duration.

For representation reasons, the duration of the elementary period has been chosen equal to that of the activation period Tr.

The first time grid 26 and the second time grid 27 are to the same scale and represent respectively the events arriving at the emitter 10 of the gateway 1 and at the receiver 18 of the communication module 7.

In particular, the first time grid 26 shows the periodic succession of synchronization signal 17 emission windows 28, in each radiobroadcasting period of duration Tx.

The second time grid 27 shows the periodic succession of awake windows 29 of the receiver 18 of the communication module 7, in each activation period of duration Tr.

In FIGS. 5 and 6, it is observed that the clocks of the communication module 7 and of the gateway 1 are not synchronized. Indeed, the first few emission windows 28 and awake windows 29 do not overlap.

As we shall see, the clocks of the communication module 7 and of the gateway 1 do not need to be synchronized in order for an overlap of the emission 28 and awake 29 windows to occur in a determined maximum duration called the convergence duration Tc.

Indeed, the duration Tr of the activation period is equal by design to:

$$Tr=Tx/(1+DC).$$

By virtue of this choice, the maximum convergence duration Tc is equal to:

$$Tc=Tr*DC^{-1}$$

Thus, it is possible, by design, to choose a convergence duration Tc by imposing a duration Tr of activation period which is chosen for a given duty cycle DC.

Here, the duty cycle being equal to DC=10%, the convergence duration Tc is therefore equal to 10 times the duration Tr of the activation period. For a duration Tr=6 s, the convergence duration Tc is therefore equal to a minute.

Thus, on completion of 10 successive activation periods, it is certain that an overlap between an awake window 29 and an emission window 28 will occur.

In the example of FIG. 5, this overlap 30 occurs at the $8^{th}$ activation period represented. In the example of FIG. 6, this overlap 30 occurs at the $2^{nd}$ activation period represented.

As represented, the emitter 19 of the communication module 7 then emits the data message 20 after a preconfigured or random duration of latency Δ.

Thus, several communication modules 7 can emit data messages 20 toward the same gateway 1, since the desynchronization of the awake periods 29 of the communication modules 7 and the dispatching of the data message 20 after a duration of latency Δ differing from one communication module to the other make it possible to minimize the risks that two data message 20 originating from two different communication modules arrive simultaneously at the receiver 10 of the gateway 1.

Figure 7:
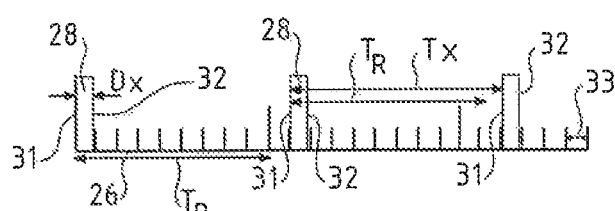
FIG. 7 is a magnified diagram of the periodic emission of a synchronization signal.

FIG. 7 shows an important aspect of the invention. The time grid 26 is represented magnified for the needs of the illustration. As represented, each emission window 28 exhibits a start 31 and an end 32. Each emission window 28 exhibits a duration Dx. Each start 31 of an emission window 28 is separated from the start 31 of a following emission window 28 by the duration of the radiobroadcasting period Tx.

The duration of the radiobroadcasting period Tx is equal to the sum of the duration of the activation period Tr and of the duration Dx of the emission window 28. Thus, the start 31 of an emission window 28 is offset by the duration Dx from the start 31 of a following emission window 28.

The activation period can be cut up into a number N of successive elementary slots 33. For a number N equal to $DC^{-1}$, the duration of an elementary slot 33 is equal to the duration Dx of the emission window 28.

After a number N−1 of activation periods, equal to the number of elementary slots 33 minus an elementary slot, each of the successive elementary slots 33 of the activation period has therefore been overlapped by an emission window 28.

Thus, an awake window 29, essentially regardless of its duration and its start date in an activation period, will necessarily be overlapped by an emission window 28 after a number N−1 of activation periods.

Thus, the communication of data between a communication module 7 and a gateway 1 is possible, while having very short durations of awake windows 29 and of emission windows 28 so as to economize on the battery of the communication module 7 and of the gateway 1.

It is important to note that the decrease in the duration Tr of the activation period may bring about a decrease in the lifetime of the batteries of the communication module 7 and of the gateway 1.

Moreover, a duration Tr of the activation period chosen too short may lead to congestion in the gateway 1 of the data messages 20 originating from the communication modules 7 in the case of a dense network of communication modules 7.

It is therefore necessary to seek a compromise taking account in particular of the regulatory constraints.

For a regulatory duty cycle value of 10%, the numerical durations cited in the examples of the figures hereinabove are satisfactory.

Figure 1:
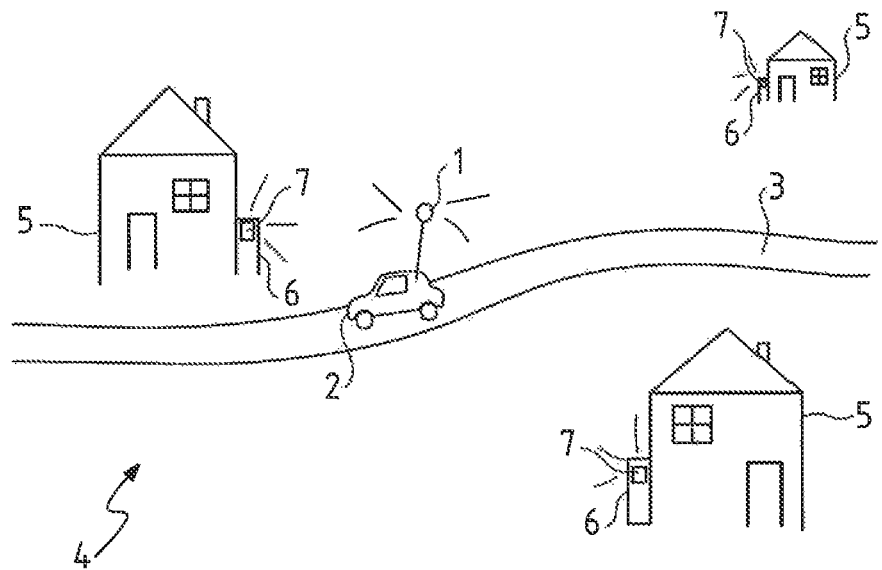
FIG. 1 is a diagram of a mobile gateway performing a remote reading of communication modules of water meters of a village.
Figure 2:
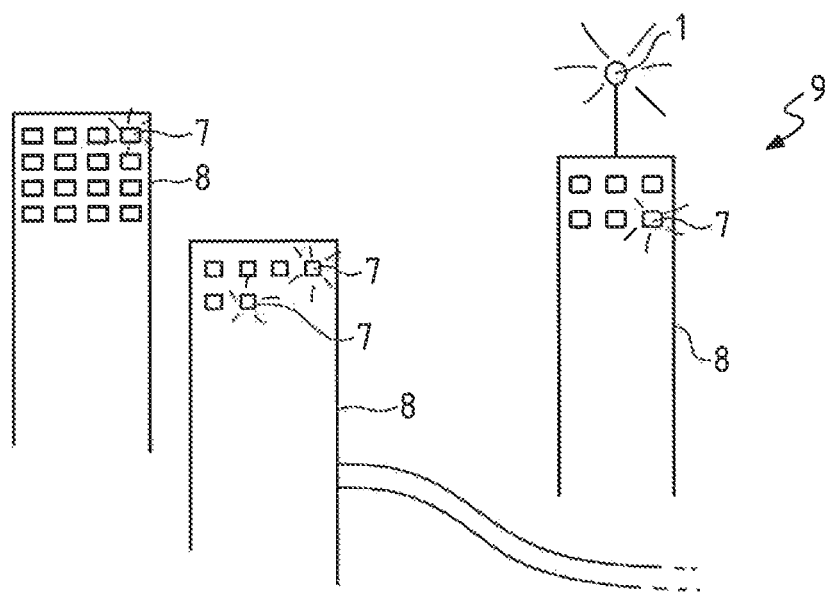
FIG. 2 is a diagram of a fixed gateway performing a remote reading of communication modules of water meters of a district of a town.

FIGS. 1 and 2 will illustrate an advantageous use of the invention.

FIG. 1 represents a village 4 in which there are a few houses 5. Each of these houses 5 is equipped with a water meter 6.

Beforehand, an employee of the firm supplying the water to the houses 5 regularly had to go in person to read the water consumption indices indicated on the water meters 6.

By virtue of the invention, remote transmission of the indices of the water consumption of each house 5 is made possible.

An embodiment of the invention provides for this purpose a gateway 1 onboard a car 2. The gateway 1 makes it possible to communicate by radio waves in a radius of a kilometer.

Each water meter 6 is equipped with a communication module 7 able to communicate by radio wave with the gateway 1.

The reading of the water consumption indices is made possible by the radio communication of the gateway 1 with the car 2. It can thus read the indices of the water meters 6 of all the houses 5 situated in the range of the gateway 1 at each position of the car. As the car 2 is moving on a road 3 passing through the village 4, the extent of the geographical zone that can be covered by one and the same gateway 1 onboard a car 2 is increased.

Thus, the invention provides a solution for covering a large geographical zone with the aid of one and the same gateway 1.

The invention is particularly advantageous in that it makes it possible to integrate into the gateway 1 a battery with a lifetime of more than 10 years.

FIG. 2 represents a town 9 in which there are apartment blocks 8. Each of the apartments of these apartment blocks 8 or of these apartment blocks 8 is equipped with a water meter 6 itself equipped with a communication module 7. A gateway 1 is installed on an antenna above the roof of one of the apartment blocks 8 and has a range of a kilometer. Remote reading of each water meter 6 is therefore made possible for all the apartment blocks 8 in the range of the gateway 1, similarly to the description of FIG. 1.

Thus, the invention provides a solution for covering a communication module 7 zone of high density with the aid of one and the same gateway.

In the preceding description, the parameters Tx, Tr and Tc are constant.

In an evolved embodiment, the parameters Tx, Tr and Tc could evolve over time according to a characteristic time greater than the convergence duration Tc, preferably greater than 5 times the convergence duration Tc.

Although the invention has been described in conjunction with several particular embodiments, it is very obvious that it is in no way limited thereto and that it comprises all the technical equivalents of the means described as well as their combinations if the latter enter within the scope of the invention.

The use of the verb "comprise" or "include" and of the conjugated forms thereof does not exclude the presence of elements other than or of steps other than those stated in a claim. The use of the indefinite article "an" or "a" for an element or a step does not exclude, unless mentioned to the contrary, the presence of a plurality of such elements or steps.

In the claims, any reference sign between parentheses should not be interpreted as a limitation of the claim.

The invention claimed is:

1. A method for establishing a communication between a gateway and a communication module, comprising:
   periodically radiobroadcasting in successive radiobroadcasting periods from a gateway a synchronization signal, the synchronization signal being emitted during an emission window exhibiting a defined duration Dx within each radiobroadcasting period,
   periodically activating in successive activation periods a receiver of a communication module, the receiver being activated during an awake window within each activation period, the duration of the awake window being less than the duration Tr of the activation period,
   receiving the synchronization radio signal by the receiver of the communication module during an overlap between the awake window and the emission window,
   radiobroadcasting a data message from an emitter of the communication module, the radiobroadcasting of the data message being triggered by reception of the synchronization signal,
   receiving the data message by a receiver of the gateway,
   wherein a duty cycle DC=Dx/Tx between a duration of the emission window Dx of the synchronization signal and a duration Tx of the radiobroadcasting period is less than 50%, and
   wherein a duration Tr of the activation period is equal to Tr=Tx/(1+DC).

2. The method according to claim 1, wherein the radiobroadcasting of the data message is triggered after a latency lag (Δ) following reception of the synchronization signal by the receiver of the communication module.

3. The method according to claim 2, wherein the latency lag (Δ) is less than the duration Tr of the activation period.

4. The method according to claim 1, wherein the duty cycle DC is less than a regulatory threshold.

5. The method according to claim 1, wherein a radiobroadcasting range of the gateway is greater than 1km.

6. The method according to claim 1, wherein the gateway is geographically mobile.

7. The method as claimed in according to claim 1, wherein the duration Tx of the radiobroadcasting period is between 2 seconds and 30 seconds.

8. The method as claimed in according to claim 1, wherein the receiver of the communication module prolongs a duration of the awake window during an overlap between the awake window and the emission window, until an end of the emission window.

9. A gateway intended to communicate wirelessly with a communication module comprising a receiver exhibiting successive awake windows periodically repeated with a period of duration Tr, the gateway comprising:
   a clock configured to periodically trigger a radiobroadcasting of a synchronization signal in successive radiobroadcasting periods, the radiobroadcasting period exhibiting a duration Tx,
   an emitter configured to radiobroadcast the synchronization signal, the synchronization signal being emitted during an emission window exhibiting a defined duration Dx within each radiobroadcasting period,
   a receiver configured to receive a data message from an emitter of the communication module subsequent to an overlap between an awake window of the receiver of the communication module and the emission window,
   wherein a duty cycle DC=Dx/Tx between a duration of the emission window Dx of the synchronization signal and a duration of the radiobroadcasting period Tx is less than 50%, the duration Tx of the radiobroadcasting period is Tx=Tr*(1+DC).

10. The gateway as claimed in according to claim 9, further comprising a communication interface with a network, configured to transmit the data message to the network.

11. An automotive vehicle comprising a gateway as claimed in claim 9, in which the emitter of the gateway exhibits a radiobroadcasting range of greater than 1 km.

12. A communication module able to transmit data to a gateway, the communication module comprising:
   a receiver,
   a clock configured to periodically trigger the activation of the receiver in activation periods during an awake window, the duration of the awake window being less than 1% of the duration Tr of the activation period,
   the receiver being able to receive a synchronization radio signal emitted by a gateway during an overlap of an awake window with an emission window of a synchronization signal emitted by a gateway,
   a memory comprising data to be transmitted,
   an emitter configured to radiobroadcast a data message in response to reception of the synchronization radio signal by the receiver.

13. A radio communication system comprising a gateway according to claim 9 and a plurality of communication modules disposed in a zone of radio coverage of the emitter of the gateway.

14. The radio communication system according to claim 13, wherein the emitter of each communication module is configured to radiobroadcast the data message after a latency lag (Δ) following reception of the synchronization signal by the receiver of the communication module, the latency lag (Δ) being configured in a memory of the communication module.

* * * * *